(12) United States Patent
Rebetge

(10) Patent No.: US 6,859,292 B2
(45) Date of Patent: Feb. 22, 2005

(54) APPARATUS FOR SCANNING ORIGINALS

(75) Inventor: Lutz Rebetge, Kiel (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 614 days.

(21) Appl. No.: 09/957,389

(22) Filed: Sep. 20, 2001

(65) Prior Publication Data

US 2002/0089705 A1 Jul. 11, 2002

Related U.S. Application Data

(63) Continuation of application No. PCT/DE00/00713, filed on Mar. 7, 2000.

(30) Foreign Application Priority Data

Mar. 20, 1999 (DE) .......................................... 199 12 691

(51) Int. Cl.⁷ ................................................. H04N 1/04
(52) U.S. Cl. ....................... 358/487; 358/475; 358/497; 358/474
(58) Field of Search ................................. 358/475, 487, 358/497, 474, 471, 494, 509, 505, 506, 514, 512, 513, 483; 250/234, 235, 236, 208.1, 578.1; 399/211; 382/312, 318, 319; 362/249, 250, 551, 257

(56) References Cited

U.S. PATENT DOCUMENTS

| | | | | |
|---|---|---|---|---|
| 4,989,099 A | | 1/1991 | Koshiyouji et al. .......... | 358/487 |
| 5,251,072 A | * | 10/1993 | Fukuoka et al. ............ | 359/896 |
| 5,381,245 A | * | 1/1995 | Johnston et al. ............ | 358/487 |
| 5,432,622 A | * | 7/1995 | Johnston et al. ............ | 358/474 |
| 6,233,065 B1 | * | 5/2001 | Lee ............................. | 358/475 |
| 6,486,980 B1 | * | 11/2002 | Sawanobori ................ | 358/487 |
| 6,721,072 B1 | * | 4/2004 | Tsai et al. .................... | 358/471 |

FOREIGN PATENT DOCUMENTS

| | | |
|---|---|---|
| EP | 0 516 092 A2 | 12/1992 |
| GB | 2 323 732 A | 3/1997 |
| JP | 6233070 | 8/1994 |
| JP | 10308851 | 11/1998 |

\* cited by examiner

Primary Examiner—Cheukfan Lee
(74) Attorney, Agent, or Firm—Laurence A. Greenberg; Werner H. Stemer; Ralph E. Locher

(57) ABSTRACT

An apparatus for point by point and line by line scanning of originals or documents includes a fixed, transparent original carrier for an original. An illumination carrier is disposed above and parallel to the original carrier. An illumination unit is fixed to the illumination carrier for illuminating the original line by line. A base carrier parallel to the illumination carrier is disposed under the original carrier and an optoelectronic scanning head for converting scanning light into picture signals is fixed thereon. The illumination carrier and the base carrier are interconnected by a U-shaped connecting element. The connecting element has a rotary joint for pivoting the illumination carrier away from the original carrier with the illumination unit to facilitate access to the original carrier. The illumination unit and the scanning head perform a perpendicularly oriented feed movement in relation to scanning lines through the use of linear guides, in order to scan a surface of the original.

14 Claims, 2 Drawing Sheets

APPARATUS FOR SCANNING ORIGINALS

CROSS-REFERENCE TO RELATED APPLICATION

This application is a continuation of copending International Application No. PCT/DE00/00713, filed Mar. 7, 2000, which designated the United States.

BACKGROUND OF THE INVENTION

Field of the Invention

The invention relates to the field of electronic reproduction technology and relates in particular to an apparatus for scanning originals or documents opto-electronically point by point and line by line. The apparatus is referred to below as a scanner.

In a scanner which is constructed, for example, as a flatbed scanner for transmitted light scanning, a transparent original to be scanned is located on a fixed-position, transparent and flat original carrier. The original is illuminated line by line by an illumination unit. A scanning head having an optoelectronic converter, for example in the form of a row of photodiodes, is disposed on a side of the original carrier which faces away from the illumination unit. Scanning light modulated by lightness values of scanned image points is converted in the optoelectronic converter of the scanning head into electrical image signal values.

In order to two-dimensionally scan the original, the illumination unit and the scanning head are moved synchronously over the original, at right angles to the direction of the scanning lines, through the use of a suitable feed drive.

Flatbed scanners are already known in which the illumination unit and the scanning head are guided separately and are each moved by an feed drive. The synchronous movement of the illumination unit and the scanning head is achieved through the use of appropriate control of the two feed drives. As a result of the separate mechanical guides for the illumination unit and the scanning head, and as a result of the expenditure on control, such a device is relatively complicated.

UK Patent Application GB 2 323 732 A has already disclosed a flatbed scanner which is identical to the generic type and in which an illumination unit disposed above an original carrier and a scanning head disposed underneath the original carrier are coupled to each other through a rigid connecting element and are moved in the feed direction by a common drive. The illumination unit can be pivoted onto an edge of the original carrier, parallel to the original carrier, and can be locked there during transport.

European Patent Application 0 516 092 A2, corresponding to U.S. Pat. No. 5,251,072, specifies a flatbed scanner in which the illumination unit and the scanning head are likewise mechanically coupled through a connecting element and are driven jointly in the feed direction. In the case of that flatbed scanner, the illumination unit can be plugged into the connecting element from above.

A similar flatbed scanner is disclosed by U.S. Pat. No. 5,218,485.

SUMMARY OF THE INVENTION

It is accordingly an object of the invention to provide an apparatus for scanning originals opto-electronically point by point and line by line, which overcomes the hereinafore-mentioned disadvantages of the heretofore-known devices of this general type in such a way that, with straightforward expenditure on device technology, both synchronous movement of an illumination unit and a scanning head as well as a great degree of user friendliness are ensured.

With the objects of the invention in view, there is also provided an apparatus for scanning originals point by point and line by line, comprising a fixed-position original carrier for an original. The original carrier has a long side and a longitudinal direction. A pivotal illumination device is disposed above the original carrier and is extended in a line direction over the original carrier, for illuminating the original line by line. An optoelectronic scanning head is disposed underneath the original carrier, for converting scanning light into image signals. A connecting element is movable at the long side of the original carrier. The connecting element carries the illumination device and the scanning head and executes a feed movement at right angles to the line direction, for two-dimensionally scanning the original. The connecting element has a rotary joint with an axis of rotation extended in the longitudinal direction of the original carrier, for pivoting the illumination device about the rotary joint away from the original carrier into a plane oriented at an angle to the original carrier.

Other features which are considered as characteristic for the invention are set forth in the appended claims.

Although the invention is illustrated and described herein as embodied in an apparatus for scanning originals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
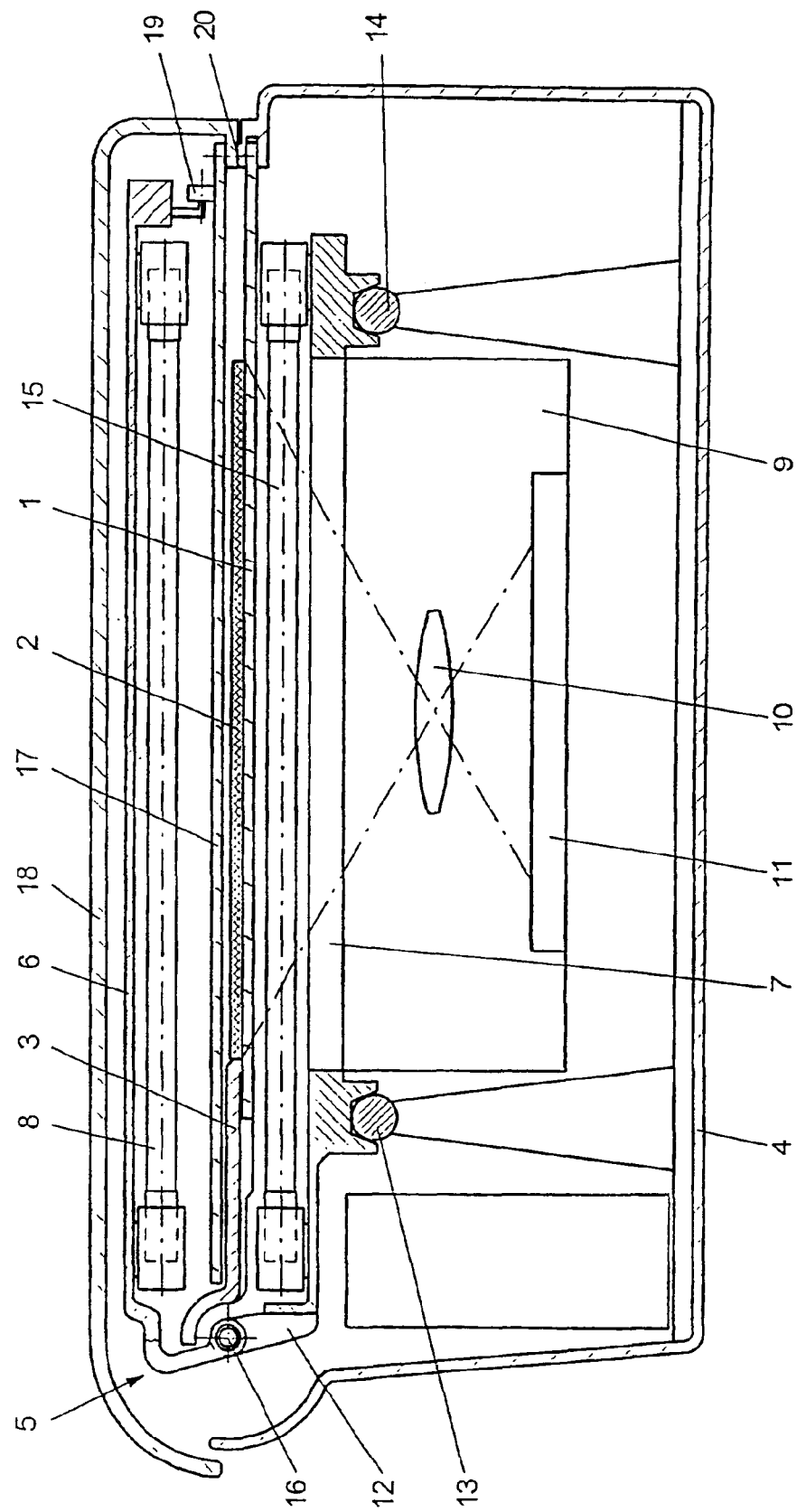
FIG. 1 is a diagrammatic, cross-sectional view of a flatbed scanner.

Referring now to the figures of the drawings in detail and first, particularly, to FIG. 1 thereof, there is seen a cross sectional representation of an exemplary embodiment of a flatbed scanner. An original or document 2 to be scanned, for example a transmitted-light original, is disposed on a fixed-position, transparent original carrier or support 1. The original carrier 1 is fixed through the use of a holder 3 to a housing 4 of the flatbed scanner. A scanning carriage 5 has an illumination carrier 6 disposed above the original 2 and a base carrier 7 disposed underneath the original 2. A transmitted light illumination unit 8, for example in the form of a fluorescent tube, for illuminating the original 2 line by line, is fixed to the illumination carrier 6. The illumination carrier 6 and the illumination unit 8 together form a pivotal illumination device. A scanning head 9 is fitted to the base carrier 7. The scanning head 9 has a scanning objective 10 and an optoelectronic converter 11 which, for example, is constructed as a row of photodiodes oriented in the direction of scanning lines. The base carrier 7 is configured in such a way that scanning light coming from the original 2, unimpeded by the scanning objective 10, can fall onto the optoelectronic converter 11, in which the scanning light modulated by brightness values of scanned image points can be converted into electric image signal values.

The illumination carrier 6 and the base carrier 7 are connected to each other by a connecting element 12, which extends in a U shape around one side of the original carrier 1. In order to two-dimensionally scan the original 2, the scanning carriage 5 with the transmitted light illumination unit 8 and the scanning head 9 executes a feed movement over the original 2, oriented at right angles to the direction of the scanning lines, that is to say at right angles to the plane of the drawing. The scanning carriage 5 is guided by linear guides 13, 14 fixed to the housing 4. The feed movement of the scanning carriage 5 is carried out, for example, through the use of a non-illustrated advance motor. A corresponding reflected light illumination unit 15 is fitted to the base carrier 7 of the scanning carriage 5, in order to scan reflected light originals.

The illumination carrier 6 with the transmitted light illumination unit 8 is disposed in such a way that it can be pivoted away from the original carrier 1, in order to obtain better access to the original carrier 1. To this end, the connecting element 12 has a rotary or pivot joint 16, with an axis of rotation which extends in the feed direction of the scanning carriage 5.

A dividing plate 17 which, for example, is formed of a transparent material, like the original carrier 1, is disposed between the transmitted light illumination unit 8 and the original 2. The illumination carrier 6, with the transmitted light illumination unit 8, is supported on the dividing plate 17 through the use of a roller 19 during the feed movement.

The housing 4 has an appliance cover 18 that can be folded or pivoted up and is disposed above the transmitted light illumination unit 8. When the appliance cover 18 is folded up, the dividing plate 17 and the illumination carrier 6 with the transmitted light illumination unit 8 are folded up at the same time through the use of a coupling element 20. In order to avoid any relative movement between the appliance cover 1a and the illumination carrier 6, a non-illustrated axis of rotation of the appliance cover 18 expediently coincides with the axis of rotation of the rotary joint 16.

In the vicinity of the rotary joint 16, edge regions of the appliance cover 18 and of the housing 4 of the flatbed scanner have a rounded shape, for example a quarter circular arc, in such a way that a pivoting movement of the appliance cover 18 that overlaps the housing 4 is achieved. This means that injuries to an operator, for example crushed fingers, can be avoided.

Likewise, the holder or mounting 3 for the original carrier 1 in the vicinity of the rotary joint 16 is provided with a rounded course, which means that manual access to the rotary joint 16 is prevented in all conceivable pivoting positions.

The relative association between the scanning head 9 and the transmitted light illumination unit 8 is preferably carried out in such a way that, in the operating position illustrated in FIG. 1, the result is a substantially parallel configuration of the scanning head 9 and the transmitted light illumination unit 8 as well as a configuration of the elements 8 and 9 one above the other using the smallest possible spacing. In this way, both uniform illumination and high utilization of the available light intensity can be assisted.

Figure 2:
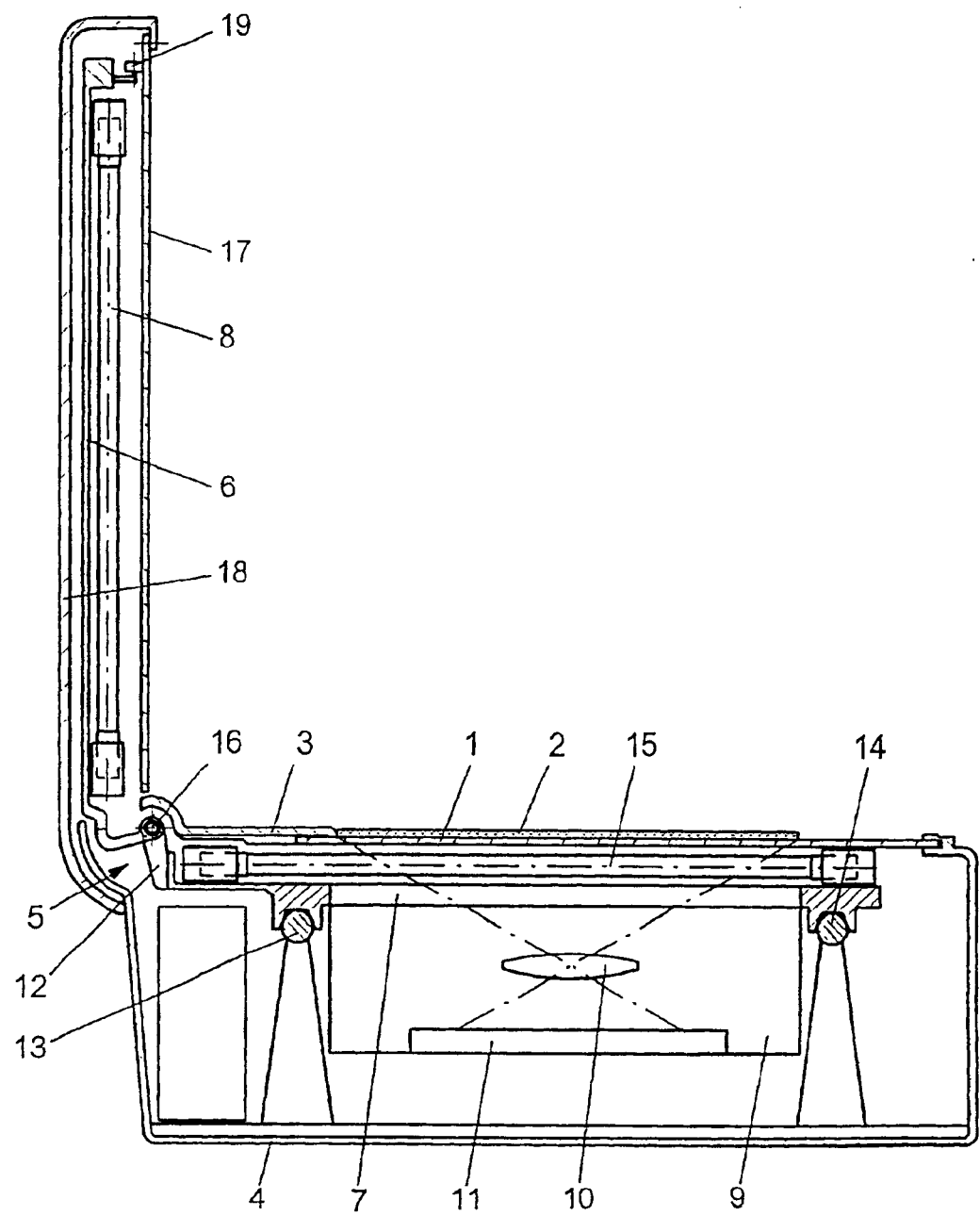
FIG. 2 is a cross-sectional view of a further representation of the flatbed scanner.

FIG. 2 shows a further cross-sectional illustration of the flatbed scanner in which the dividing plate 17 and the illumination carrier 6 with the transmitted light illumination unit 8 have been pivoted or folded up, at the same time as the appliance cover 18. In the position shown, the original carrier 1 is easily accessible, and the original 2 can be laid on the original carrier 1 or removed from the latter in a straightforward manner. The rounded contoured regions of the housing 4 and of the appliance cover 18 have been pushed one over the other in the manner of a shell. It is also possible to see that the rotary joint 16 is covered by the rounded contour of the holder or mounting 3 even in the folded or pivoted-up position.

When the appliance cover 18 has been folded up, it is possible to lay relatively thick reflected light originals, for example pages of a book, on the original carrier 1 and to scan them. In this operating mode, the illumination is provided exclusively by the reflected light illumination unit 15.

I claim:

1. An apparatus for scanning originals point by point and line by line, comprising:

a fixed-position original carrier for an original, said original carrier having a long side and a longitudinal direction;

a pivotal illumination device disposed above said original carrier and extended in a line direction over said original carrier, for illuminating the original line by line;

an optoelectronic scanning head disposed underneath said original carrier, for converting scanning light into image signals; and a connecting element movable at said long side of said original carrier;

said connecting element carrying said illumination device and said scanning head and executing a feed movement at right angles to the line direction, for two-dimensionally scanning the original; and said connecting element having a rotary joint with an axis of rotation extended in said longitudinal direction of said original carrier, for pivoting said illumination device about said rotary joint away from said original carrier into a plane oriented at an angle to said original carrier.

2. The apparatus according to claim 1, wherein:

said illumination device includes an illumination carrier fixed to said connecting element and an illumination unit fitted to said illumination carrier;

a base carrier fixes said scanning element to said connecting element; and said illumination carrier, said connecting element and said base carrier are disposed in a U shape An relation to one another and extend around said original carrier.

3. The apparatus according to claim 1, including a dividing plate disposed between said illumination device and said original carrier.

4. The apparatus according to claim 3, including a roller supporting said illumination device on said dividing plate.

5. The apparatus according to claim 1, including:

a housing accommodating said illumination device, said original carrier and said scanning head; and an appliance cover disposed above said illumination device, said appliance cover covering said housing and having an axis of rotation substantially coinciding with said axis of rotation of said rotary joint of said connecting element;

said appliance cover being pivotal away from said original carrier into a plane disposed at an angle to said original carrier.

6. The apparatus according to claim 5, including a coupling element permitting said appliance cover and maid illumination device to be pivoted jointly away from said original carrier.

7. The apparatus according to claim 5, wherein said housing and said appliance cover overlap in the vicinity of said rotary joint and have a rounded contour.

8. The apparatus according to claim 1, wherein said illumination device is a transmitted light illumination unit for illuminating transmitted-light originals.

9. The apparatus according to claim 1, wherein said original carrier is a glass plate.

10. The apparatus according to claim 1, including a reflected light illumination unit disposed underneath said original carrier for illuminating reflected-light originals.

11. The apparatus according to claim 1, wherein said scanning head has a scanning objective and an optoelectronic converter.

12. The apparatus according to claim 11, wherein said optoelectronic converter is a row of photodiodes oriented parallel to said original carrier.

13. The apparatus according to claim 1, including linear guides, said illumination device, said scanning head and said connecting element forming a scanning carriage to be displaced in a feed direction by said linear guides.

14. A flatbed scanner for scanning originals point by point and line by line, comprising:

a fixed-position original carrier for an original, said original carrier having a long side and a longitudinal direction;

a pivotal illumination device disposed above said original carrier and extended in a line direction over said original carrier, for illuminating the original line by line;

an optoelectronic scanning head disposed underneath said original carrier, for converting scanning light into image signals; and a connecting element movable at said long side of said original carrier;

said connecting element carrying said illumination device and said scanning head and executing a feed movement at right angles to the line direction, for two-dimensionally scanning the original; and said connecting element having a rotary joint with an axis of rotation extended in said longitudinal direction of said original carrier, for pivoting said illumination device about said rotary joint away from said original carrier into a plane oriented at an angle to said original carrier.

* * * * *